US008885327B2

(12) United States Patent
Kawahigashi et al.

(10) Patent No.: US 8,885,327 B2
(45) Date of Patent: Nov. 11, 2014

(54) SWITCHGEAR

(75) Inventors: Masato Kawahigashi, Tokyo (JP); Takashi Harada, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 213 days.

(21) Appl. No.: 13/641,338

(22) PCT Filed: Jun. 3, 2010

(86) PCT No.: PCT/JP2010/059460
§ 371 (c)(1), (2), (4) Date: Oct. 15, 2012

(87) PCT Pub. No.: WO2011/151912
PCT Pub. Date: Dec. 8, 2011

(65) Prior Publication Data
US 2013/0033798 A1 Feb. 7, 2013

(51) Int. Cl.
*H02B 7/01* (2006.01)
*H01H 33/42* (2006.01)
*H02B 1/20* (2006.01)

(52) U.S. Cl.
CPC .................................... *H01H 33/42* (2013.01)
USPC ........... 361/618; 361/605; 361/612; 361/619; 218/7; 218/14; 218/26; 218/84; 218/154

(58) Field of Classification Search
USPC ......... 361/600, 601, 604, 605, 610, 612, 618, 361/619, 621; 218/7, 10, 13, 14, 21, 26, 43, 218/57, 143, 154, 152, 153, 158, 140, 84, 218/90, 78, 118; 200/48 A, 48 R, 273, 274, 200/401, 500, 501, 550, 571, 572, 293, 320, 200/308; 174/14 R, 21 C, 17 R, 17 GF, 17.08, 174/28, 29, 68, 79, 99 B, 520, 70 B, 73.1
See application file for complete search history.

(56) References Cited

U.S. PATENT DOCUMENTS 5,828,025 A * 10/1998 Neumaier et al. .............. 218/79
6,624,370 B1 * 9/2003 Soga et al. ...................... 218/43
(Continued)

FOREIGN PATENT DOCUMENTS

JP 60-21141 U 2/1985
JP 61-101927 A 5/1986
(Continued)

OTHER PUBLICATIONS

International Search Report (PCT/ISA/210) issued on Aug. 10, 2010, by the Japanese Patent Office as the International Searching Authority for International Application No. PCT/JP2010/059460.

(Continued)

*Primary Examiner* — Michail V Datskovskiy
(74) *Attorney, Agent, or Firm* — Buchanan Ingersoll & Rooney PC

(57) ABSTRACT

A switchgear having an electrified conductor accommodated in a tank in which insulating gas is contained includes a fixed contact connected to the electrified conductor, a movable contact installed to be contactable and separable to and from the fixed contact, an insulating rod that is externally extended from inside of the tank while being electrically insulated from the tank and turned by an operation device, and an insert that is extended from an end of the insulating rod toward the movable contact and is rotatably supported by a holding part installed in the electrified conductor. A flange part that is installed in the insert at a position where the holding part opposes the insulating rod and is extended in a substantially right-angle direction with respect to a direction of a rotation axis of the insulating rod is formed on the insert.

9 Claims, 7 Drawing Sheets

(56) References Cited

U.S. PATENT DOCUMENTS

| | | | | |
|---|---|---|---|---|
| 7,705,262 | B2 * | 4/2010 | Allaire et al. | 218/2 |
| 8,212,165 | B2 * | 7/2012 | Fujita et al. | 200/274 |
| 2007/0262055 | A1 * | 11/2007 | Allaire et al. | 218/143 |
| 2009/0166168 | A1 * | 7/2009 | Nakauchi et al. | 200/48 R |

FOREIGN PATENT DOCUMENTS

| | | | | | |
|---|---|---|---|---|---|
| JP | 03-215105 | A | | 9/1991 | |
| JP | 5-36731 | U | | 5/1993 | |
| JP | 5-39113 | U | | 5/1993 | |
| JP | 406197423 | A | * | 7/1994 | H02B 13/02 |
| JP | 2002-152929 | A | | 5/2002 | |

OTHER PUBLICATIONS

Written Opinion (PCT/ISA/237) issued on Aug. 10, 2010, by the Japanese Patent Office as the International Searching Authority for International Application No. PCT/JP2010/059460.

* cited by examiner (a)

(b)

SWITCHGEAR

FIELD

The present invention relates to a switchgear used in a generator main circuit.

BACKGROUND

In recent years, a switchgear in which insulating gas is contained is often used in terms of size reduction and appearance of substations. Such a switchgear is configured so that a fixed contact and a movable contact contact and separate to and from each other to turn on and off power.

Various drive mechanisms for a movable contact have been proposed hitherto. For example, a switchgear disclosed in Patent Literature 1 mentioned below includes an insulating operating rod that is driven to rotate by an operation device installed outside the switchgear and a rack that engages with a pinion arranged at the other end of the operating rod to drive a movable contact. This switchgear is configured so that, by the operation device rotating the pinion via the operating rod, the rack is driven in a direction perpendicular to an axis of the operating rod to cause the movable contact to contact and separate to and from a fixed contact. Furthermore, according to the conventional technique represented by Patent Literature 1 mentioned below, an operating rod is supported by a bearing and it is common to use grease for the bearing to reduce frictions accompanied by the rotation of the operating rod.

CITATION LIST

Patent Literature

Patent Literature 1: Japanese Patent Application Laid-open No. S61-101927

SUMMARY

Technical Problem

However, when the grease used for the bearing runs down the operating rod and contacts a tank, the insulation property between the movable contact and the tank is decreased. Therefore, in the conventional technique represented by Patent Literature 1 mentioned above, it is necessary to take measures such as additionally installing grease-scattering preventing means for preventing the grease to flow out from the bearing from being adhered on the operating rod or arranging the operating rod in a vertical direction of the bearing. Consequently, the flexibility of device arrangement in the switchgear is restricted.

The present invention has been achieved in view of the above problems, and an object of the present invention is to provide a switchgear that can improve the flexibility of device arrangement in the switchgear.

Solution to Problem

There is provided a switchgear according to an aspect of the present invention including an electrified conductor accommodated in a container in which insulating gas is contained, a movable contact installed within the electrified conductor, and a movable mechanism that advances and retracts the movable contact, the switchgear including: an insulating rod that is extended from outside of the container toward the movable mechanism while being electrically insulated from the container and is rotatably installed in the container; an insert that is rotatably supported by the electrified conductor while one end of which is connected to the movable mechanism and the other end of which is embedded into the insulating rod; and a sliding unit that is interposed between the insert and the electrified conductor to slide the insert, wherein a flange part extending from a center of an axis of the insulating rod in a radial direction is formed on the insert between the insulating rod and the sliding unit.

Advantageous Effects of Invention

According to the present invention, it is possible to improve the flexibility of device arrangement in a switchgear.

DESCRIPTION OF EMBODIMENTS

Exemplary embodiments of a switchgear according to the present invention will be explained below in detail with reference to the accompanying drawings. The present invention is not limited to the embodiments.

First Embodiment

Figure 1:
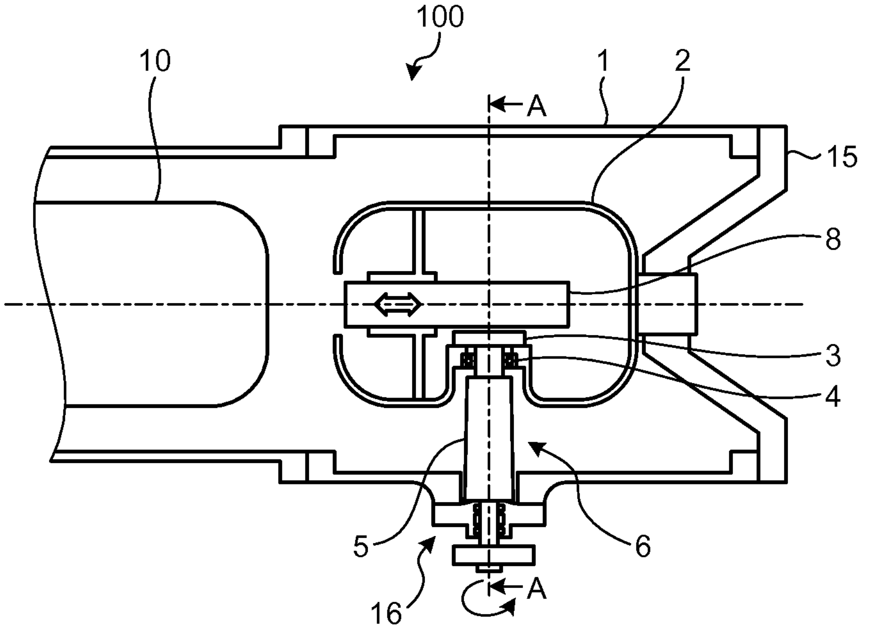
FIG. 1 is a cross-sectional view of an overall configuration of a switchgear according to a first embodiment of the present invention.
Figure 2:
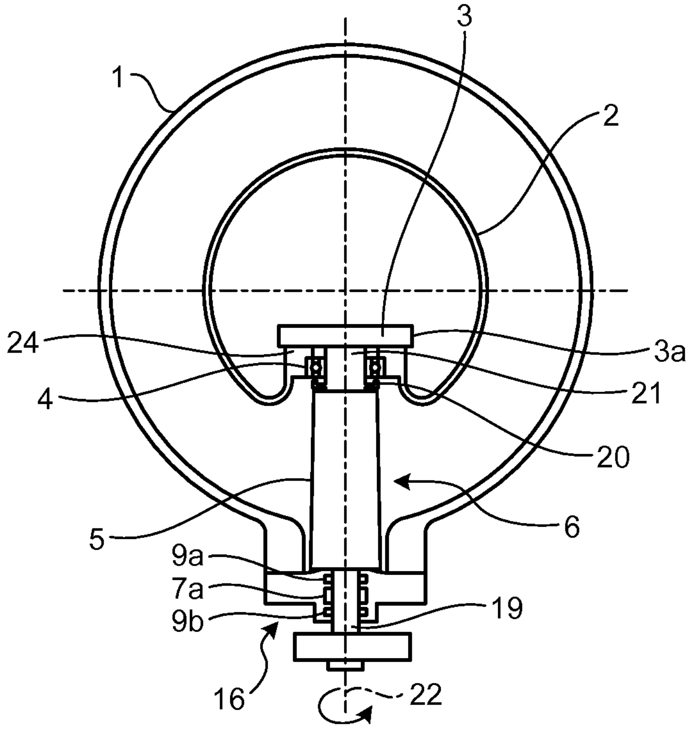
FIG. 2 is a horizontal cross-sectional view taken along a line A-A shown in FIG. 1.

FIG. 1 is a cross-sectional view of an overall configuration of a switchgear according to a first embodiment of the present invention, and FIG. 2 is a horizontal cross-sectional view taken along a line A-A shown in FIG. 1.

A cylindrical tank (container) 1 serving as a so-called casing of a switchgear 100 functions as an external conductor being at a ground potential. Insulating gas is contained in the tank 1, and various electric devices such as an instrument transformer and a current transformer are also accommodated in the tank 1. In the tank 1, as an example, a high-voltage electrified conductor 2, and a fixed contact 10 and a movable contact 8 serving as a mechanism for interrupting a current flowing in the electrified conductor 2 are shown.

The electrified conductor 2 is accommodated in the tank 1 while being supported by a spacer 15 that partitions the tank 1. The movable contact 8 installed to oppose the fixed contact 10 is supported by the electrified conductor 2 so as to be able to advance and retract and contact to and separate from the fixed contact 10 by a drive mechanism 6.

The drive mechanism 6 is mainly constituted by a movable mechanism 3 that converts a rotation movement of an insulating rod 5 into a linear movement to advance and retract the movable contact 8, the insulating rod 5, an insert 21, and an insert 19.

The insulating rod 5 is extended from outside of the tank 1 toward the movable mechanism 3 while being electrically insulated from the tank 1 and is rotatably installed in the tank 1. An end of the insert 21 is connected to the movable mechanism 3 and the other end thereof is embedded into the insulating rod 5, and the insert 21 is rotatably supported by the electrified conductor 2. A sliding unit 24 is interposed between the insert 21 and the electrified conductor 2 to slide the insert 21. A flange part 20 extending from a center of an axis of the insulating rod 5 in a radial direction is formed on the insert 21 between the insulating rod 5 and the sliding unit 24.

While the insert 21 or a coupling 14 is configured to be slidable by using a bearing 4 or an O-ring 9 for the sliding unit 24 in the following explanations, as long as it is slidable, any structure can be applied. For example, a column made of oil metal or Delrin (registered trademark) can be used.

The bearing 4 is fitted into the electrified conductor 2. The insert 21 embedded in one end of the insulating rod 5 is extended from the insulating rod 5 toward the movable contact 8 and is rotatably supported by the bearing 4.

The flange part 20 (not shown in FIG. 1) extending in a substantially right-angle direction with respect to a direction of a rotation axis 22 of the insulating rod 5 is formed on the insert 21. The insert 21 and the flange part 20 are explained later in detail.

The insert 19 embedded into the other end of the insulating rod 5 is extended from the insulating rod 5 toward a side of a shaft sealing unit 16 and is rotatably supported by O-rings 9*a* and 9*b* installed in the shaft sealing unit 16. The shaft sealing unit 16 prevents insulating gas hermetically sealed in the tank 1 at a pressure higher than the atmospheric pressure from leaking outside from a part into which the insert 19 penetrates. A grease storage unit 7*a* that accumulates grease for reducing frictions at the time of rotation of the insert 19 is provided between the O-ring 9*a* and the O-ring 9*b* arranged below the O-ring 9*a*.

The insert 19 externally protrudes from the tank 1 via the shaft sealing unit 16, and an operation device (not shown) that turns the movable mechanism 3 is attached to the insert 19.

The movable mechanism 3 is connected to the insert 21 and the movable mechanism 3 is extended from a center of the rotation axis 22 of the insulating rod 5 in a radial direction thereof. A free end 3*a* of the movable mechanism 3 turns according to an operation amount transmitted from the operation device to the insulating rod 5. With this configuration, by turning the movable mechanism 3, the fixed contact 10 is electrically connected to the movable contact 8 or the fixed contact 10 is electrically disconnected from the movable contact 8. While the connection structure between the movable mechanism 3 and the movable contact 8 is omitted in FIGS. 1 and 2, for example, a crank mechanism or a drive mechanism using a rack and a pinion can be applied.

A basic structure of the insert 21 according to the present embodiment is explained below with reference to FIG. 3, and then other structures of the insert 21 are explained with reference to FIGS. 4 to 8.

Figure 3:
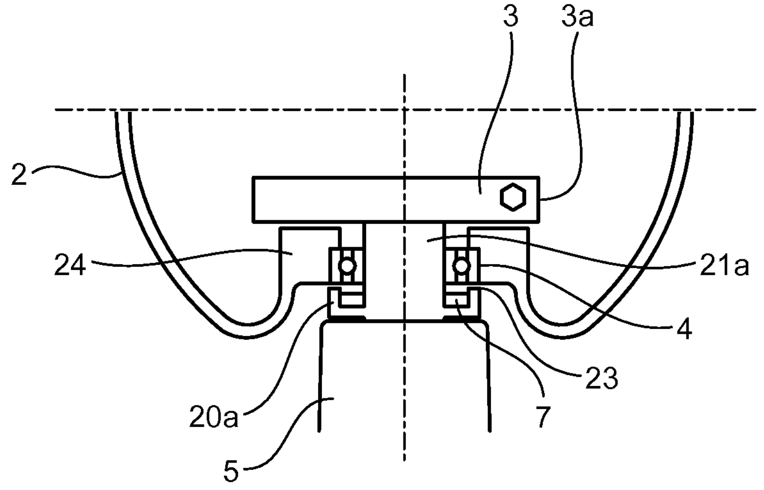
FIG. 3 is an explanatory diagram of a configuration of a first drive mechanism according to the first embodiment.

FIG. 3 is an explanatory diagram of a configuration of a first drive mechanism according to the first embodiment. FIG. 3 depicts the electrified conductor 2, the movable mechanism 3, the insulating rod 5, the bearing 4, which are explained above, and an insert 21*a*. The insert 21*a* embedded into one end of the insulating rod 5 is extended from the insulating rod 5 toward the movable contact 8 and is rotatably supported by the bearing 4.

A flange part 20*a* extending from the center of the rotation axis 22 in a radial direction is formed on the insert 21*a* between the insulating rod 5 and the sliding unit 24. An end part 23 of the flange part 20*a* is bent to a side of the bearing 4 at a position of a predetermined length from an outer circumferential surface of the insert 21*a*. It suffices that this predetermined length is equal to or longer than, for example, a length obtained by adding the thickness of an inner ring of the bearing 4 to the diameter of a rolling element of the same.

An operation thereof is explained below. When a torque from an operation device (not shown) is transmitted to the insulating rod 5, the torque is transmitted via the movable mechanism 3 to the movable contact 8. Grease accumulated within the bearing 4 runs down the outer circumferential surface of the insert 21*a* to gradually flow out to a side of the flange part 20*a* arranged in a vertical direction of the bearing 4. Therefore, the grease is accumulated in a grease storage unit 7 formed in the flange part 20*a*.

By providing such a structure, the insert 21*a* exerts a grease storing function of accumulating grease leaked out from the bearing 4 in a vertical direction. While a clearance is formed between surfaces where the end part 23 of the flange part 20*a* opposes the bearing 4 in FIG. 3, it suffices that the clearance is formed within an extent that the bearing 4 does not contact the flange part 20*a*.

Figure 4:
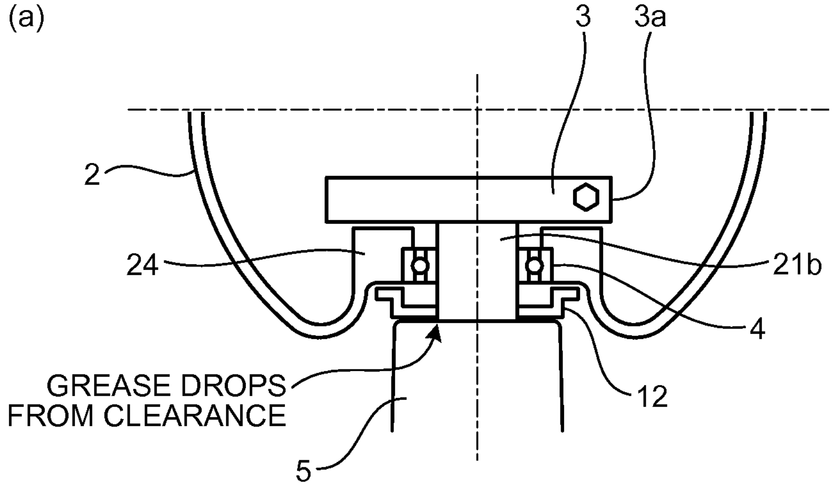
FIG. 4 are explanatory diagrams of a configuration of a second drive mechanism according to the first embodiment.
Figure 4:
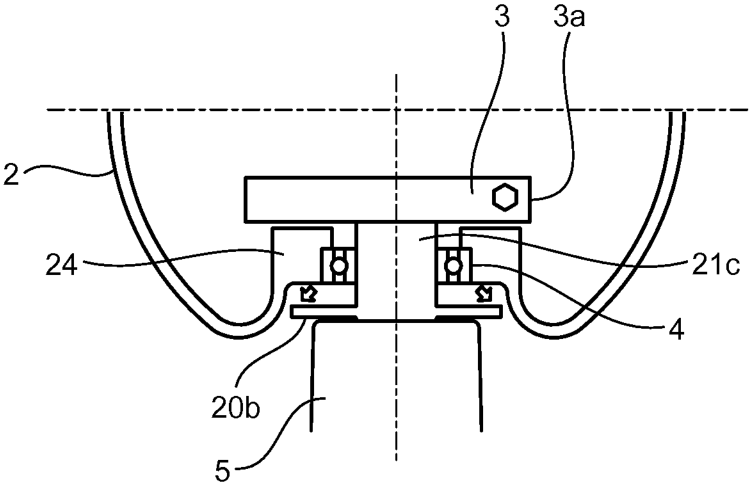

FIG. 4 are explanatory diagrams of a configuration of a second drive mechanism according to the first embodiment. FIG. 4(*a*) depicts a case of installing a cover 12 for preventing grease-scattering between the bearing 4 and the insulating rod 5, and is an example of the grease-scattering preventing means described in the above section of "Background". FIG. 4(*b*) depicts a structure of an insert 21*c* according to the present embodiment. Elements identical to those shown in FIGS. 1 to 3 are denoted by like reference signs, explanations thereof will be omitted, and only different elements are explained below.

The cover 12 shown in FIG. 4(*a*) is formed to have a cone-shaped cross-section for surrounding an insert 21*b*, and has a grease-scattering preventing function of preventing grease scattering from the bearing 4 from being adhered on the insulating rod 5. The cover 12 is mounted on the insert 21*b* in advance when the insulating rod 5 is connected to the movable mechanism 3, and is installed between the bearing 4 and the insulating rod 5 by the insert 21*b* being inserted into the bearing 4. Therefore, a clearance caused by an assembling difference is easily formed between an outer circumferential surface of the insert 21*b* and the cover 12, and the grease may drop from the clearance onto the insulating rod 5.

Meanwhile, as shown in FIG. 4(*b*), a flange part 20*b* is formed on the insert 21*c* according to the embodiment of the present invention. That is, the flange part 20*b* is formed in a shape extending from the center of the rotation axis 22 in a radial direction between the insulating rod 5 and the sliding unit 24. It suffices that this predetermined length is equal to or longer than a length obtained by adding the thickness of the inner ring of the bearing 4, the diameter of the rolling element, and the thickness of an outer ring of the bearing 4.

An operation thereof is explained below. When a torque from an operation device (not shown) is transmitted to the insulating rod 5, the torque is transmitted via the movable mechanism 3 to the movable contact 8. Grease accumulated within the bearing 4 runs down an outer circumferential surface of the insert 21*c* to flow out to a side of the flange part 20*b* arranged in a vertical direction of the bearing 4. Additionally, when the torque from the operation device is large, the grease sometimes scatters in a circumferential direction. The flange part 20*b* prevents the grease scattering in this way from being adhered on the insulating rod 5. Furthermore, the flange part 20*b* is configured integrally with the insert 21*c*. Therefore, the cover 12 shown in FIG. 4(*a*) is unnecessary and the number of components can be reduced.

Figure 5:
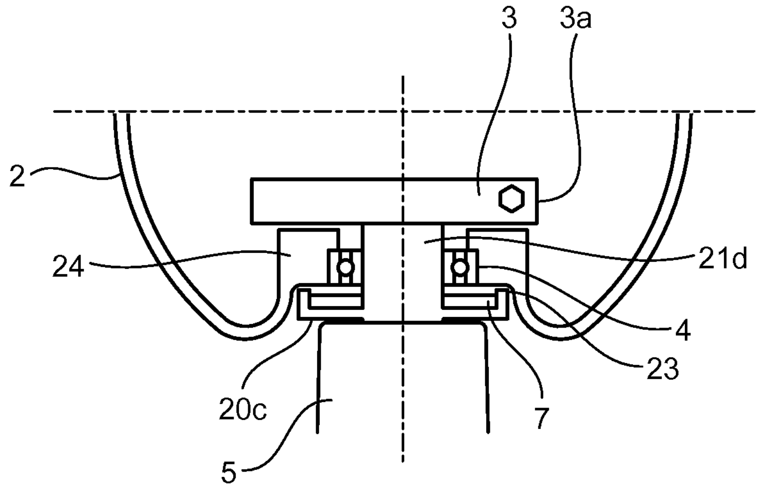
FIG. 5 is an explanatory diagram of a configuration of a third drive mechanism according to the first embodiment.

FIG. 5 is an explanatory diagram of a configuration of a third drive mechanism according to the first embodiment. In the following explanations, an outline of a configuration of the drive mechanism according to the present embodiment is explained first with reference to FIG. 5, and then conventional problems are described with reference to FIG. 6. Elements identical to those shown in FIGS. 1 to 3 are denoted by like reference signs, explanations thereof will be omitted, and only different elements are explained below.

A flange part 20*c* extending from the center of the rotation axis 22 in a radial direction is formed on an insert 21*d* shown in FIG. 5 between the insulating rod 5 and the sliding unit 24. The end part 23 of the flange part 20*c* is bent to the side of the bearing 4 at a position of a predetermined length from an outer circumferential surface of the insert 21*d*. It suffices that this predetermined length is equal to or longer than, for example, a length obtained by adding the thickness of the inner ring of the bearing 4, the diameter of the rolling element, and the thickness of the outer ring of the bearing 4.

An operation thereof is explained below. When a torque from an operation device (not shown) is transmitted to the insulating rod 5, the torque is transmitted via the movable mechanism 3 to the movable contact 8. Grease accumulated within the bearing 4 runs down the outer circumferential surface of the insert 21*d* to flow out to a side of the flange part 20*c* arranged in a vertical direction of the bearing 4. Additionally, when the torque from the operation device is large, the grease sometimes scatters in a circumferential direction. The flange part 20*c* prevents the grease scattering in this way from being adhered on the insulating rod 5.

Figure 6:
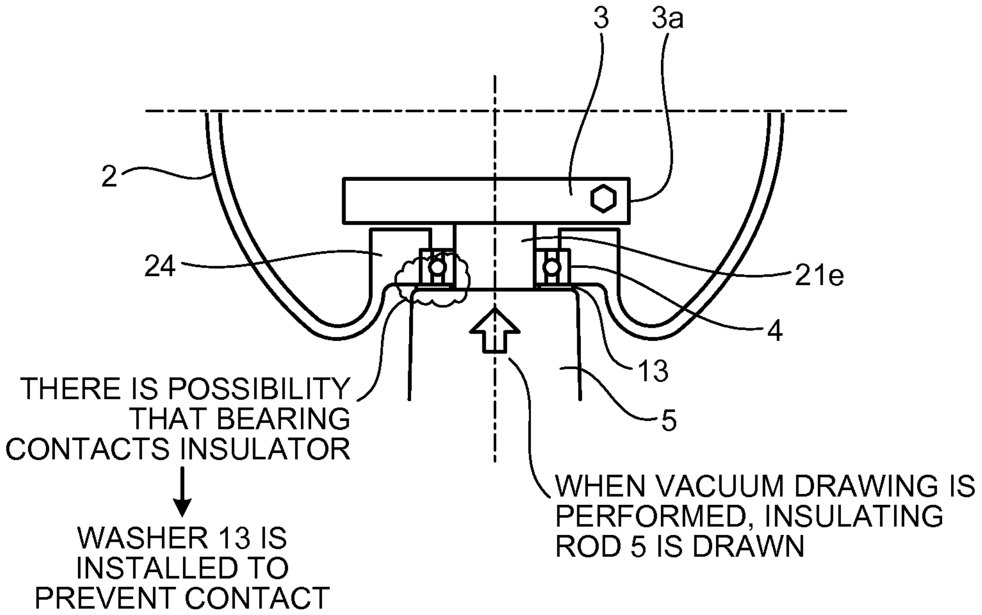
FIG. 6 is an explanatory diagram of problems when a washer is installed between a bearing and an insulating rod.

FIG. 6 is an explanatory diagram of problems when a washer is installed between a bearing and an insulating rod, and depicts a structure of a conventional drive mechanism. Similarly to the cover 12 explained above, a washer 13 is mounted on an insert 21*e* in advance when the insulating rod 5 is connected to the movable mechanism 3, and is installed between the bearing 4 and the insulating rod 5.

When insulating gas is replenished in the tank 1, it is necessary to perform so-called vacuum drawing in the tank 1 in advance. In this case, the insulating rod 5 is drawn toward the side of the bearing 4 because of the pressure difference at the time of the vacuum drawing. When the washer 13 is not installed, the bearing 4 and the insulating rod 5 make contact and thus grease is adhered on the insulating rod 5.

According to the conventional drive mechanism, in order to prevent such adhesion of grease, it has been attempted to install the washer 13. However, similarly to the case of the cover 12, grease may drop from a clearance between an inner circumferential surface of the washer 13 and an outer circumferential surface of the insert 21*e*, and thus it has been difficult to obtain sufficient effects.

Meanwhile, because the flange part 20*c* extending in a substantially right-angle direction with respect to the direction of the rotation axis 22 is formed on the insert 21*d* shown in FIG. 5, the bearing 4 is physically blocked from the insulating rod 5 and thus the adhesion of grease on the insulating rod 5 is prevented. That is, the insert 21*d* exerts the grease-scattering preventing function, as well as the grease storing function described above. Furthermore, the flange part 20*c* is configured integrally with the insert 21*d*. Therefore, the cover 12 shown in FIG. 4(*a*) and the washer 13 shown in FIG. 6 are unnecessary and the number of components can be reduced.

Because the insert 21 described above is configured integrally with the insulating rod 5, for example, when the insulating rod 5 is disassembled at the time of maintenance or the like, the insert 21 is drawn out in the direction of the rotation axis 22 together with the insulating rod 5. More specifically, the movable mechanism 3 needs to be detached when the insert 21 is drawn out and needs to be connected again to the insert 21 when the insulating rod 5 is assembled. At this time, a process of collecting and refilling insulating gas accompanied by the detachment of the movable mechanism 3 is required.

A fourth drive mechanism according to the first embodiment explained below is used for solving such problems. A configuration thereof is explained below with reference to FIG. 7.

Figure 7:
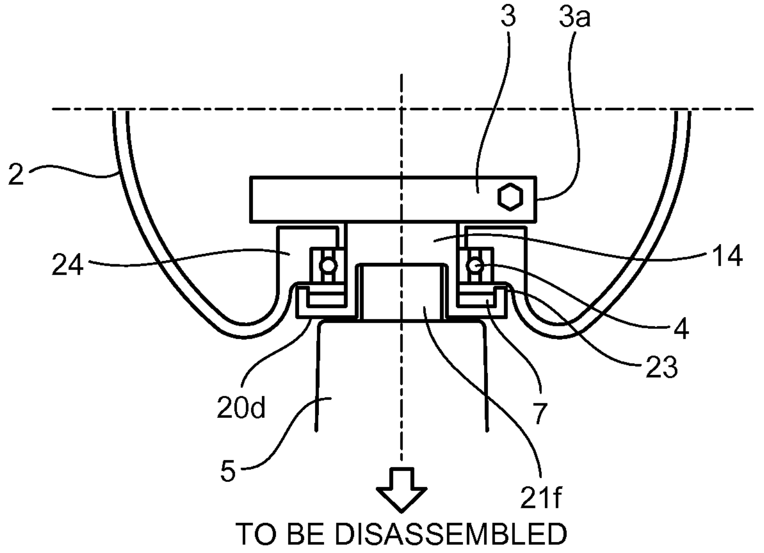
FIG. 7 is an explanatory diagram of a configuration of a fourth drive mechanism according to the first embodiment.

FIG. 7 is an explanatory diagram of the configuration of the fourth drive mechanism according to the first embodiment. The drive mechanism shown in FIG. 7 is mainly constituted by the coupling 14, an insert 21*f* fitted into the coupling 14, the movable mechanism 3, and the insulating rod 5.

The bearing 4 is fitted into the sliding unit 24 formed on a part of the electrified conductor 2, and the coupling 14 is installed to be rotatable by the bearing 4.

The coupling 14 is formed in a cylindrical shape that is circumscribed about an inner circumferential surface of the bearing 4, and is installed between the movable mechanism 3 and the insulating rod 5. An outer circumferential surface of the insert 21*f* is fitted into an inner circumferential surface of the coupling 14. It suffices that a fitting shape of the coupling 14 and the insert 21*f* is a shape that can transmit a rotation torque from the insulating rod 5 to the movable mechanism 3. For example, the inner circumferential surface of the coupling 14 can be formed in a gear shape and the outer circumferential surface of the insert 21*f* can be formed in a shape capable of being fitted into the inner circumferential surface of the coupling 14.

Furthermore, a flange part 20*d* extending from the center of the rotation axis 22 in a radial direction is formed on the coupling 14 between the insulating rod 5 and the sliding unit 24. The end part 23 of the flange part 20*d* is bent to the side of the bearing 4 at a position of a predetermined length from an outer circumferential surface of the coupling 14. It suffices that this predetermined length is equal to or longer than, for example, a length obtained by adding the thickness of the inner ring of the bearing 4, the diameter of the rolling element, and the thickness of the outer ring of the bearing 4.

An operation thereof is explained below. When a torque from an operation device (not shown) is transmitted to the insulating rod 5, the torque is transmitted via a fitting part of the insert 21*f* and the coupling 14 to the movable mechanism 3 and the movable contact 8 in this order. Grease accumulated within the bearing 4 runs down the outer circumferential surface of the coupling 14 to flow out to a side of the flange part 20*d* arranged in a vertical direction of the bearing 4. Additionally, when the torque from the operation device is large, the grease sometimes scatters in a circumferential direction. The flange part 20*d* prevents the grease scattering in this way from being adhered on the insulating rod 5.

Furthermore, the coupling 14 is configured so that not only the grease storing function and the grease-scattering preventing function are exerted but also the insulating rod 5 can be disassembled without detaching the movable mechanism 3 from the insert 21*f*. Therefore, the process of collecting and refilling insulating gas accompanied by the detachment of the movable mechanism 3 is unnecessary and a process of disassembling the insulating rod 5 can be significantly reduced.

Figure 8:
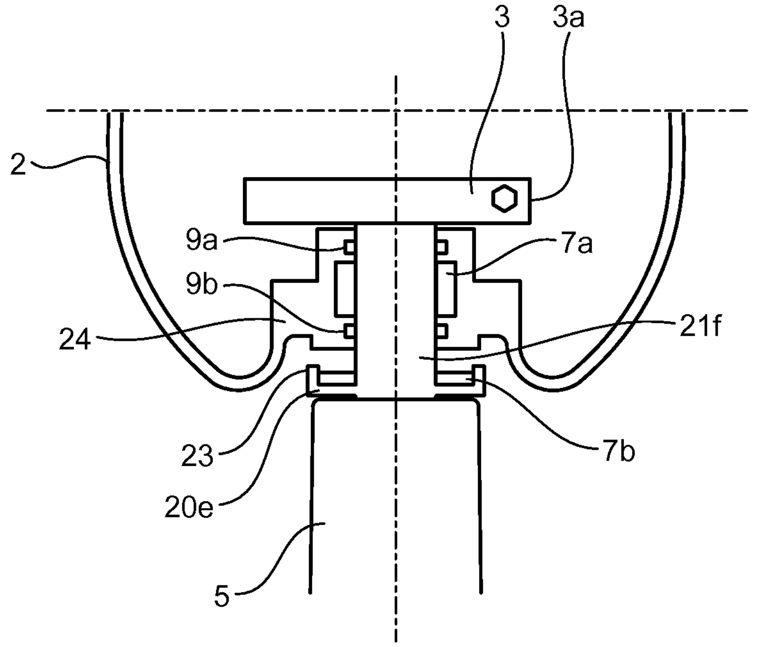
FIG. 8 is an explanatory diagram of a configuration in a case of applying the drive mechanism according to the first embodiment to a sealing structure using an O-ring.

FIG. 8 is an explanatory diagram of a configuration in a case of applying the drive mechanism according to the first embodiment to a sealing structure using an O-ring.

The O-rings 9*a* and 9*b* are installed in the sliding unit 24 shown in FIG. 8 instead of the bearing 4 and the grease storage unit 7*a* is provided between the O-ring 9*a* and the O-ring 9*b*. The insert 21*f* is rotatably supported by these O-rings 9*a* and 9*b*. A flange part 20*e* extending from the center of the rotation axis 22 in a radial direction is formed on the insert 21*f* between the insulating rod 5 and the sliding unit 24. The end part 23 of the flange part 20*e* is bent to the side of the bearing 4 at a position of a predetermined length from the outer circumferential surface of the insert 21*f*. While this predetermined length is not particularly limited, this predetermined length is desirably determined by taking the amount of grease flowing out from the grease storage unit 7*a* along the insert 21*f* into consideration.

An operation thereof is explained below. When a torque from an operation device (not shown) is transmitted to the insulating rod 5, the torque is transmitted via the insert 21*f* to the movable mechanism 3 and the movable contact 8 in this order. Grease accumulated within the grease storage unit 7*a* runs down the outer circumferential surface of the insert 21*f* to flow out to a side of the flange part 20*e* arranged in a vertical direction of the bearing 4. The flange part 20*e* prevents the grease flowing out in this way from being adhered on the insulating rod 5.

As explained above, the switchgear according to the present embodiment includes the insulating rod 5 that is extended from outside of the tank 1 toward the movable mechanism 3 while being electrically insulated from the tank 1 and is rotatably installed in the tank 1, the insert 21 that is rotatably supported by the electrified conductor 2 while one end of which is connected to the movable mechanism 3 and the other end of which is embedded into the insulating rod 5, and the sliding unit 24 that is interposed between the insert 21 and the electrified conductor 2 and slides the insert 21. Because the flange part 20 extending from the center of the axis of the insulating rod 5 in a radial direction is formed on the insert 21 between the insulating rod 5 and the sliding unit 24, the grease scattering prevention function can be exerted without using the cover 12 shown in FIG. 4 and the washer 13 shown in FIG. 6, and the number of components can be reduced.

Because the end part 23 of the flange part 20 according to the present embodiment is bent to a side of the movable mechanism 3, the grease storing function can be exerted.

Because the end part 23 of the flange part 20 according to the present embodiment is configured to be bent to the side of the bearing 4 at a position of a predetermined length from the outer circumferential surface of the insert 21 and that this predetermined length is equal to or longer than a length obtained by adding the thickness of the inner ring of the bearing 4, the diameter of the rolling element, and the thickness of the outer ring of the bearing 4 as explained with reference to FIG. 5, the grease storing function and the grease-scattering preventing function can be achieved at the same time.

The switchgear according to the present embodiment includes the insulating rod 5 that is extended from outside of the tank 1 toward the movable mechanism 3 while being electrically insulated from the tank 1 and is rotatably installed in the tank 1, the insert 21*f* that is embedded in an axial direction of the insulating rod 5 and is extended from the insulating rod 5 toward the movable mechanism 3, the coupling 14 that is rotatably supported by the electrified conductor 2 while one end of which is connected to the movable mechanism 3 and the other end of which is fitted into the insert 21*f*, and the sliding unit 24 that is interposed between the coupling 14 and the electrified conductor 2 and slides the insert 21*f*. The flange part 20*d* extending from the center of the axis of the insulating rod 5 in a radial direction is formed on the coupling 14 between the insulating rod 5 and the sliding unit 24. Consequently, not only the grease storing function and the grease-scattering preventing function can be exerted, but also the process of disassembling the insulating rod 5 can be significantly reduced.

The drive mechanism 6 according to the present embodiment can be also applied to the sealing structure using the O-ring 9 (the sliding unit 24). Also in this case, not only the grease storing function and the grease-scattering preventing function can be exerted, but also the number of components can be reduced. The drive mechanism 6 shown in FIG. 7 can be also applied to the sealing structure using the O-ring 9. In this case, not only the grease storing function and the grease-scattering preventing function can be exerted, but also the process of disassembling the insulating rod 5 can be significantly reduced.

Second Embodiment

While a structure of preventing grease from being adhered on the insulating rod 5 has been explained in detail in the above descriptions, a switchgear according to a second embodiment has a function of lubricating the bearing 4 or the O-ring 9, as well as the grease storing function and the grease-scattering preventing function. A configuration of the switchgear according to the second embodiment is explained below with reference to FIGS. 9 to 11. Elements identical to those described in the first embodiment are denoted by like reference signs, explanations thereof will be omitted, and only different elements are explained below.

Figure 9:
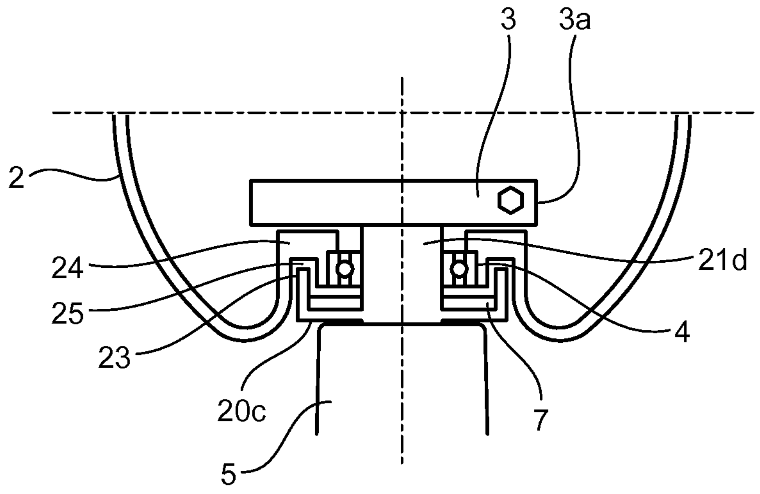
FIG. 9 is an explanatory diagram of a configuration of a first drive mechanism according to a second embodiment.

FIG. 9 is an explanatory diagram of a configuration of a first drive mechanism according to the second embodiment. The insert 21*d* and the sliding unit 24 shown in FIG. 9 are provided by modifying the shape of the insert 21*d* and the sliding unit 24 shown in FIG. 5.

The insert 21*d* embedded into one end of the insulating rod 5 is extended from the insulating rod 5 toward the movable contact 8 and is rotatably supported by the bearing 4 installed in the electrified conductor 2. A ring-shaped depressed part 25 is formed in the sliding unit 24 between a part into which the bearing 4 is fitted and the electrified conductor 2.

A flange part 20*c* extending from the center of the axis of an insulating rod in a radial direction is formed on the insert 21*d* between the insulating rod 5 and the sliding unit 24. The end part 23 of the flange part 20*c* is bent to a side of the sliding unit 24 at a position of the depressed part 25 and is extended so as to enter the space of the depressed part 25. It suffices that the height of the end part 23 of the flange part 20*c* is equal to or higher than, for example, an added length from a bottom end of the insert 21*d* to the rolling element of the bearing 4. It is desirably configured that the end part 23 of the flange part 20*c* does not contact a wall surface of the depressed part 25.

An operation thereof is explained below. When a torque from an operation device (not shown) is transmitted to the insulating rod 5, the torque is transmitted via the movable mechanism 3 to the movable contact 8. Grease accumulated within the bearing 4 runs down an outer circumferential surface of the insert 21*d* to flow out to a side of the flange part 20*c* arranged in a vertical direction of the bearing 4. Additionally, when the torque from the operation device is large, the grease sometimes scatters in a circumferential direction. The flange part 20*c* prevents the grease scattering in this way from being adhered on the insulating rod 5. Furthermore, because the flange part 20*c* is formed to cover the bearing 4 from below, the bearing 4 is always lubricated by grease in the grease storage unit 7 and thus the durability of the drive mechanism 6 can be improved.

Figure 10:
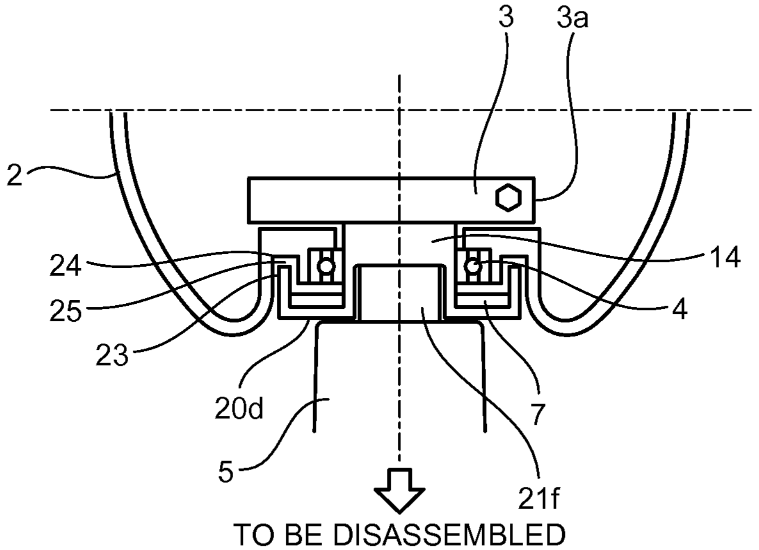
FIG. 10 is an explanatory diagram of a configuration of a second drive mechanism according to the second embodiment.

FIG. 10 is an explanatory diagram of a configuration of a second drive mechanism according to the second embodiment. The coupling 14 and the sliding unit 24 shown in FIG. 10 are provided by modifying the shape of the coupling 14 and the sliding unit 24 shown in FIG. 7.

The coupling 14 is formed in a cylindrical shape that is circumscribed about the inner circumferential surface of the bearing 4, is installed between the movable mechanism 3 and the insulating rod 5, and is installed to be rotatable by the bearing 4 installed in the electrified conductor 2. The ring-shaped depressed part 25 is formed in the sliding unit 24 between a part into which the bearing 4 is fitted and the electrified conductor 2.

The coupling 14 is formed in a cylindrical shape that is circumscribed about the inner circumferential surface of the bearing 4, is installed between the movable mechanism 3 and the insulating rod 5, and the outer circumferential surface of the insert 21*f* is fitted into an inner circumferential surface of the coupling 14. It suffices that a fitting shape of the coupling 14 and the insert 21*f* is a shape that can transmit a rotation torque from the insulating rod 5 to the movable mechanism 3.

Furthermore, the flange part 20*d* extending from the center of the rotation axis 22 in a radial direction is formed on the coupling 14 between the insulating rod 5 and the sliding unit 24. The end part 23 of the flange part 20*d* is bent to the side of the sliding unit 24 at the position of the depressed part 25 and is extended so as to enter the space of the depressed part 25. It suffices that the height of the end part 23 of the flange part 20*d* is equal to or higher than an added length from a bottom end of the coupling 14 to the rolling element of the bearing 4. It is desirable that the flange part 20*d* and the sliding unit 24 are configured so that the end part 23 of the flange part 20*d* does not contact a wall surface of the depressed part 25.

An operation thereof is explained below. When a torque from an operation device (not shown) is transmitted to the insulating rod 5, the torque is transmitted via a fitting part of the insert 21*f* and the coupling 14 to the movable mechanism 3 and the movable contact 8 in this order. Grease accumulated within the bearing 4 runs down the outer circumferential surface of the coupling 14 to flow out to a side of the flange part 20*d* arranged in a vertical direction of the bearing 4. Additionally, when the torque from the operation device is large, the grease sometimes scatters in a circumferential direction. The flange part 20*d* prevents the grease scattering in this way from being adhered on the insulating rod 5.

Furthermore, the coupling 14 is configured so that not only the grease storing function and the grease-scattering preventing function are exerted but also the insulating rod 5 can be disassembled without detaching the movable mechanism 3 from the insert 21*f*. Therefore, the process of collecting and refilling insulating gas accompanied by the detachment of the movable mechanism 3 is unnecessary and the process of disassembling the insulating rod 5 can be significantly reduced.

Because the flange part 20*d* is formed to cover the bearing 4 from below, the bearing 4 is always lubricated by the grease in the grease storage unit 7 and thus the durability of the drive mechanism 6 can be improved.

Figure 11:
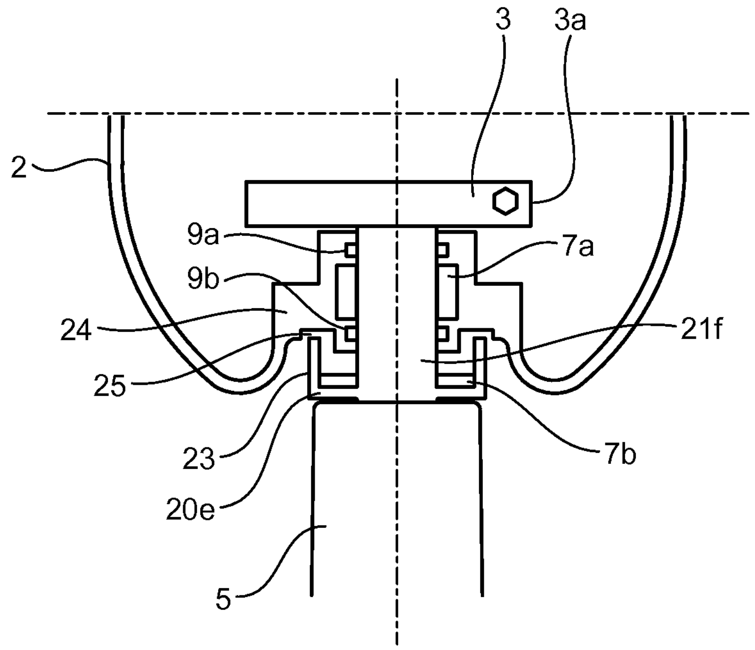
FIG. 11 is an explanatory diagram of a configuration in a case of applying the drive mechanism according to the second embodiment to a sealing structure using an O-ring.

FIG. 11 is an explanatory diagram of a configuration in a case of applying the drive mechanism according to the second embodiment to a sealing structure using an O-ring.

The O-ring 9*a* and the O-ring 9*b* arranged below the O-ring 9*a* are installed in the sliding unit 24 shown in FIG. 11, and the grease storage unit 7*a* is provided between the O-ring 9*a* and the O-ring 9*b*. Furthermore, the ring-shaped depressed part 25 is formed in the sliding unit 24 between a part in which the O-ring 9*b* is installed and the electrified conductor 2.

A flange part 20*e* extending from the center of the rotation axis 22 in a radial direction is formed on the insert 21*f* between the insulating rod 5 and the sliding unit 24. The end part 23 of the flange part 20*e* is bent to the side of the sliding unit 24 at the position of the depressed part 25 and is extended so as to enter the space of the depressed part 25. It suffices that the height of the end part 23 of the flange part 20*e* is equal to or longer than an added length from a bottom end of the insert 21*f* to the O-ring 9*b*. It is desirable that the flange part 20*e* and the sliding unit 24 are configured so that the end part 23 of the flange part 20*e* does not contact a wall surface of the depressed part 25.

An operation thereof is explained below. When a torque from an operation device (not shown) is transmitted to the insulating rod 5, the torque is transmitted via the insert 21*f* to the movable mechanism 3 and the movable contact 8 in this order. Grease accumulated within the grease storage unit 7*a* runs down the outer circumferential surface of the insert 21*f* to flow out to a side of the flange part 20*e* arranged in a vertical direction of the bearing 4. The flange part 20*e* prevents the grease flowing out in this way from being adhered on the insulating rod 5.

Because the flange part 20*e* is formed to cover the bearing 4 from below, the bearing 4 is always lubricated by grease in a grease storage unit 7*a* and thus the durability of the drive mechanism 6 can be improved.

As explained above, the switchgear according to the present embodiment includes the insulating rod 5 that is extended from outside of the tank 1 toward the movable mechanism 3 while being electrically insulated from the tank 1 and is rotatably installed in the tank 1, the insert 21 that is rotatably supported by the electrified conductor 2 while one end of which is connected to the movable mechanism 3 and the other end of which is embedded into the insulating rod 5, and the sliding unit 24 that is interposed between the insert 21 and the electrified conductor 2 and slides the insert 21. The flange part 20 extending from the center of the axis of the insulating rod 5 in a radial direction is formed on the insert 21 between the insulating rod 5 and the sliding unit 24, the ring-shaped depressed part 25 with its center being the axis of the insert 21 is formed on a surface of the electrified conductor 2 opposing the insulating rod 5, and the end part 23 of the flange part 20 is bent to a movable mechanism side so as to enter the depressed part 25. Accordingly, the grease storage unit 7 is formed without using the cover 12 and the washer 13 and the bearing 4 is always lubricated. Consequently, the durability of the drive mechanism 6 can be improved.

The switchgear according to the present embodiment includes the insulating rod 5 that is extended from outside of the tank 1 toward the movable mechanism 3 while being electrically insulated from the tank 1 and is rotatably installed in the tank 1, the insert 21 that is embedded in an axial direction of the insulating rod 5 and is extended from the insulating rod 5 toward the movable mechanism 3, the coupling 14 that is rotatably supported by the electrified conductor 2 while one end of which is connected to the movable mechanism 3 and the other end of which is fitted into the insert 21, and the sliding unit 24 that is interposed between the coupling 14 and the electrified conductor 2 and slides the insert 21. The flange part 20 extending from the center of the axis of the insulating rod 5 in a radial direction is formed on the coupling 14 between the insulating rod 5 and the sliding unit 24. The ring-shaped depressed part 25 with its center being the axis of the insert 21 is formed on the surface of the electrified conductor 2 opposing the insulating rod 5 and the end part 23 of the flange part 20 is bent to the movable mechanism side to enter the depressed part 25. Therefore, the process of disassembling the insulating rod 5 can be significantly reduced and the bearing 4 is always lubricated. Consequently, the durability of the drive mechanism 6 can be improved.

The drive mechanism 6 shown in FIG. 9 can be also applied to the sealing structure using the O-ring 9 (the sliding unit 24). Also in this case, not only the grease storing function and the grease-scattering preventing function can be exerted, but also the number of components can be reduced. Furthermore, because the bearing 4 is always lubricated, the durability of the drive mechanism 6 can be improved. The drive mechanism 6 shown in FIG. 10 can be also applied to the sealing structure using the O-ring 9. In this case, not only the grease storing function and the grease-scattering preventing function can be exerted, but also the process of disassembling the insulating rod 5 can be significantly reduced. Furthermore, because the bearing 4 is always lubricated, the durability of the drive mechanism 6 can be improved.

While the structure in which the end part 23 of the flange part 20*d* formed on the coupling 14 is bent has been explained with reference to FIGS. 7 and 10, the present invention is not limited to thereto. The flange part 20*d* formed on the coupling 14 can be configured to extend in a horizontal direction similarly to the flange part 20*b* shown in FIG. 4(*b*). Also in this case, the grease-scattering preventing function can be provided.

INDUSTRIAL APPLICABILITY

As described above, the present invention can be applicable to a switchgear used in a generator main circuit, and is useful as an invention that can improve the flexibility of device arrangement.

REFERENCE SIGNS LIST

1 TANK (CONTAINER)
2 ELECTRIFIED CONDUCTOR
3 MOVABLE MECHANISM
4 BEARING
5 INSULATING ROD
6 DRIVE MECHANISM
7 GREASE STORAGE UNIT
8 MOVABLE CONTACT
9 O-RING
10 FIXED CONTACT
12 COVER
13 WASHER
14 COUPLING
15 SPACER
16 SHAFT SEALING UNIT
20 FLANGE PART
19, 21 INSERT
22 ROTATION AXIS
23 END PART OF FLANGE PART
24 SLIDING UNIT
25 DEPRESSED PART
100 SWITCHGEAR

The invention claimed is:

1. A switchgear including an electrified conductor accommodated in a container in which insulating gas is contained, a movable contact installed within the electrified conductor, and a movable mechanism that advances and retracts the movable contact, the switchgear comprising:

an insulating rod that is extended from outside of the container toward the movable mechanism while being electrically insulated from the container and is rotatably installed in the container;

an insert that is rotatably supported by the electrified conductor while one end of which is connected to the movable mechanism and the other end of which is embedded into the insulating rod; and a sliding unit that is interposed between the insert and the electrified conductor to slide the insert, wherein a flange part extending from a center of an axis of the insulating rod in a radial direction is formed on the insert between the insulating rod and the sliding unit.

2. The switchgear according to claim 1, wherein an end part of the flange part is bent to a side of the movable mechanism.

3. The switchgear according to claim 2, wherein a ring-shaped depressed part with its center being an axis of the insert is formed on a surface of the electrified conductor opposing the insulating rod, and an end part of the flange part enters the depressed part.

4. The switchgear according to claim 1, wherein a bearing that is circumscribed about a circumference of the insert is mounted on the electrified conductor.

5. The switchgear according to claim 1, wherein an O-ring that is circumscribed about a circumference of the insert is mounted inside of the electrified conductor.

6. A switchgear including an electrified conductor accommodated in a container in which insulating gas is contained, a movable contact installed within the electrified conductor, and a movable mechanism that advances and retracts the movable contact, the switchgear comprising:

an insulating rod that is extended from outside of the container toward the movable mechanism while being electrically insulated from the container and is rotatably installed in the container;

an insert that is embedded in an axial direction of the insulating rod and is extended from the insulating rod toward the movable mechanism;

a coupling that is rotatably supported by the electrified conductor while one end of which is connected to the movable mechanism and the other end of which is fitted into the insert; and a sliding unit that is interposed between the coupling and the electrified conductor to slide the insert, wherein a flange part extending from a center of an axis of the insulating rod in a radial direction is formed on the coupling between the insulating rod and the sliding unit, and an end part of the flange part is bent to a side of the movable mechanism.

7. The switchgear according to claim 6, wherein a ring-shaped depressed part with its center being an axis of the insert is formed on a surface of the electrified conductor opposing the insulating rod, and an end part of the flange part enters the depressed part.

8. The switchgear according to claim 6, wherein a bearing that is circumscribed about a circumference of the coupling is mounted on the electrified conductor.

9. The switchgear according to claim 6, wherein an O-ring that is circumscribed about the coupling is mounted inside of the electrified conductor.

* * * * *